US012625156B2

(12) United States Patent
Piccione

(10) Patent No.: US 12,625,156 B2
(45) Date of Patent: May 12, 2026

(54) APPARATUS INCORPORATING STRAIN SENSOR FOR DETERMINING RELATIVE VELOCITY, FLOW, OR ATTACK ANGLE BETWEEN A FLUID AND A BODY

(71) Applicant: Qorvo US, Inc., Greensboro, NC (US)

(72) Inventor: Paul Piccione, Greensboro, NC (US)

(73) Assignee: Qorvo US, Inc., Greensboro, NC (US)

( * ) Notice: Subject to any disclaimer, the term of this patent is extended or adjusted under 35 U.S.C. 154(b) by 309 days.

(21) Appl. No.: 18/461,110

(22) Filed: Sep. 5, 2023

(65) Prior Publication Data

US 2024/0118304 A1      Apr. 11, 2024

Related U.S. Application Data

(60) Provisional application No. 63/411,835, filed on Sep. 30, 2022.

(51) Int. Cl.
| | |
|---|---|
| *G01P 5/04* | (2006.01) |
| *G01F 1/20* | (2006.01) |
| *G01F 1/28* | (2006.01) |
| *G01F 15/02* | (2006.01) |

(52) U.S. Cl.
CPC ............... *G01P 5/04* (2013.01); *G01F 1/206* (2013.01); *G01F 1/28* (2013.01); *G01F 15/022* (2013.01)

(58) Field of Classification Search
CPC ... G01P 5/04; G01P 5/02; G01F 1/206; G01F 1/28; G01F 15/022
See application file for complete search history.

(56) References Cited

U.S. PATENT DOCUMENTS

| | | | | |
|---|---|---|---|---|
| 2,811,855 A | * | 11/1957 | Kotas | ...................... G01F 1/206 |
| | | | | 73/861.72 |
| 3,477,289 A | * | 11/1969 | Wiebe | ................... G01L 9/0002 |
| | | | | 374/197 |
| 5,117,687 A | | 6/1992 | Gerardi | |

(Continued)

FOREIGN PATENT DOCUMENTS

| | | |
|---|---|---|
| CN | 1621843 A | 6/2005 |
| CN | 203432650 U | 2/2014 |

(Continued)

*Primary Examiner* — Paul M. West
(74) *Attorney, Agent, or Firm* — Withrow & Terranova, P.L.L.C.

(57) ABSTRACT

An apparatus including at least one deflecting element and at least one strain sensor is configured for determining relative velocity, fluid flow, or angle of attack between a fluid and a body having a fluid-contacting surface and an opposing non-fluid-contacting surface. The deflecting element is joined to the body and extends from the fluid-contacting surface into the fluid, while the strain sensor is coupled to the non-fluid-contacting surface and is configured to detect strain imparted on the body by deflection of the at least one deflecting element. An output signal of the at least one strain sensor permits calculation of at least one of relative velocity, fluid flow, or angle of attack between the fluid and the body. By measuring deflection of a surface of the body, the at least one strain sensor may be mounted on or along the non-fluid-contacting surface where the environment is controllable, such that the sensor is not subject to deleterious environmental effects.

24 Claims, 5 Drawing Sheets

(56)                References Cited

U.S. PATENT DOCUMENTS

| | | | |
|---|---|---|---|
| 7,503,227 | B2 | 3/2009 | Davis et al. |
| 7,658,113 | B2 | 2/2010 | Confield et al. |
| 10,081,410 | B2 | 9/2018 | Pyorre et al. |
| 11,118,992 | B2 | 9/2021 | Pfeiffer et al. |
| 2005/0022592 | A1 | 2/2005 | Shoemaker et al. |
| 2006/0207339 | A1* | 9/2006 | Sumigawa ............... G01B 7/18 |
| | | | 73/777 |
| 2019/0178268 | A1* | 6/2019 | Shah ................... H05H 1/2439 |

FOREIGN PATENT DOCUMENTS

| | | | |
|---|---|---|---|
| DE | 102013101193 | A1 | 8/2014 |
| EP | 2623993 | A1 | 8/2013 |
| KR | 20120138973 | A | 12/2012 |
| WO | 2021183163 | A1 | 9/2021 |

* cited by examiner

1

APPARATUS INCORPORATING STRAIN SENSOR FOR DETERMINING RELATIVE VELOCITY, FLOW, OR ATTACK ANGLE BETWEEN A FLUID AND A BODY

CROSS-REFERENCE TO RELATED APPLICATION(S)

This application claims priority to U.S. Provisional Patent Application No. 63/411,835 filed on Sep. 30, 2022, wherein the entire contents of the foregoing application are hereby incorporated by reference herein.

FIELD OF THE DISCLOSURE

The present disclosure relates to apparatuses for determining relative velocity, flow, or angle of attack between a fluid and a body, such as a vehicle or a pipe.

BACKGROUND

Sensors are used in various contexts to measure parameters such as relative velocity, flow (e.g., mass flow rate), and/or angle of attack between fluids and bodies of different types, including vehicles and pipes, among others.

Conventional velocity measurement equipment in aviation or watercraft employs Pitot-static tubes. A Pitot-static tube (or simply "Pitot tube") consists of two concentric tubes, the central one having an open end pointing upstream of the fluid flow and the other closed at the end but with small holes oriented at right angles to the direction of flow. Pitot tubes are subject to icing in aviation, lack sensitivity at lower velocity, and they increase drag on a vehicle. Incorrect readings from Pitot tubes have been the subject of multiple aircraft incidents, including fatal accidents.

Conventional measurement systems for determining mass flow of fluids utilize complicated sensors (e.g., automotive mass air flow sensors employing hot-wire anemometry) or such systems are ill-suited for monitoring in certain environments (e.g., sewage monitoring). Automotive mass air-flow sensors provide an indirect measurement method. Municipal water supply systems also rely upon indirect measurement via pressure sensors, and sewer and storm-drain systems lack such monitoring. Service to sewer and storm drain systems is typically provided through periodic manual inspections, or after a back-up is noticed during heavy use conditions.

Conventional angle-of-attack (AOA) sensors, such as those implemented on aircraft and submarines, utilize rotating foils that sense the angle of attack of a vessel through a fluid. AOA sensors are subject to failure for multiple reasons, including exposure to the elements and wear of moving parts. Incorrect readings of AOA sensors have been the subject of numerous incidents, including fatal accidents. Need exists in the art for sensing apparatuses that are simple, highly reliable, versatile, can operate over a wide range of conditions.

SUMMARY

An apparatus is configured for determining relative velocity, fluid flow, or angle of attack between a fluid and a body having a fluid-contacting surface and a non-fluid-contacting surface that opposes the fluid-contacting surface. The apparatus includes at least one deflecting element joined to the body and extending from the fluid-contacting surface into the fluid, and at least one strain sensor coupled to the non-fluid-contacting surface, wherein the at least one strain sensor is configured to detect strain imparted on the body by deflection of the at least one deflecting element. The deflecting element may be constructed of a material having a known modulus of elasticity. An output signal of the at least one strain sensor permits calculation of at least one of relative velocity, fluid flow, or angle of attack between the fluid and the body. By measuring deflection of a surface of the body, the at least one strain sensor may be mounted on or along the non-fluid-contacting surface where the environment is controllable, such that the sensor is not subject to deleterious environmental effects.

In certain embodiments, a substrate is provided between the at least one strain sensor and the non-fluid-contacting surface. The substate may comprise a printed wiring board, optionally including a processor thereon, and an adhesive material may be provided between the substrate and the non-fluid-contacting surface.

Various sensors may be associated with the apparatus is configured for determining relative velocity, fluid flow, or angle of attack. In certain embodiments, the apparatus further comprises a temperature sensor in sensory communication with the body and configured to generate a signal indicative of temperature, wherein the apparatus is configured to utilize the signal indicative of temperature to correct an output signal of the at least one strain sensor. In certain embodiments, the apparatus further comprises an altitude sensor configured to detect altitude of a vehicle and to generate a signal indicative of altitude, wherein the apparatus is configured to utilize the signal indicative of altitude to correct and/or validate an output signal of the at least one strain sensor. In certain embodiments, the apparatus further comprises a pressure sensor configured to detect pressure of the fluid to generate a signal indicative of pressure, wherein the apparatus is configured to utilize the signal indicative of pressure to correct and/or validate an output signal of the at least one strain sensor.

In certain embodiments, the body comprises an external wall, a wing, or a foil of a vehicle. In certain embodiments, the body comprises a pipe or conduit containing the fluid. In certain embodiments, at least one deflecting element extends across substantially an entire inner diameter or inner width of the pipe or conduit.

In certain embodiments, the at least one deflecting element is integrally formed with the body. In certain embodiments, the at least one deflecting element is mechanically joined or welded to the body. In certain embodiments, the at least one deflecting element comprises a first deflecting element extending radially inward in a first direction within the pipe or conduit, and a second deflecting element extending radially inward in a second direction within the pipe or conduit, wherein the second direction opposes the first direction.

In certain embodiments, the at least one deflecting element comprises a plurality of deflecting elements, the at least one strain sensor comprises a plurality of strain sensors, and each deflecting element of the plurality of deflecting elements has one or more strain sensors of the plurality of strain sensors in sensory communication therewith. In certain embodiments, the plurality of deflecting elements comprises a first deflecting element having a first length and first maximum width, and comprises a second deflecting element having a second maximum width, the apparatus further comprising at least one of the following features (i) and (ii): (i) the first length differs from the second length; and (ii) the first maximum width differs from the second maximum width. In certain embodiments, the plurality of deflecting elements comprises a first deflecting element comprising a first material, and comprises a second deflecting element comprising a second material, wherein the first material differs from the second material. In certain embodiments, the at least one strain sensor comprises a plurality of strain sensors, and the at least one deflecting element has first and second strain sensors of the plurality of strain sensors in sensory communication therewith, with the second strain sensor mounted substantially perpendicular to the first strain sensor, wherein the first strain sensor is configured to detect deflection in a first direction, and the second strain sensor is configured to detect deflection in a second direction that is substantially perpendicular to the first direction.

A method for fabricating an apparatus for determining relative velocity, fluid flow, or angle of attack between a fluid and a body having a fluid-contacting surface and a non-fluid-contacting surface that opposes the fluid-contacting surface is also provided. The method comprises forming at least one deflecting element on, or joining at least one deflecting element to, the body to cause the at least one deflecting element to extend from the fluid contacting surface to into the fluid. The method further comprises coupling at least one strain sensor to the non-fluid contacting surface so that the at least one strain sensor is configured to detect strain imparted on the body by deflection of the at least one deflecting element.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

DETAILED DESCRIPTION

An apparatus is configured for determining relative velocity, fluid flow, or angle of attack between a fluid and a body having a fluid-contacting surface and a non-fluid-contacting surface that opposes the fluid-contacting surface. The apparatus includes at least one deflecting element joined to the body and extending from the fluid-contacting surface into the fluid, and at least one strain sensor coupled to the non-fluid-contacting surface, wherein the at least one strain sensor is configured to detect strain imparted on the body by deflection of the at least one deflecting element. By positioning sensory components along a non-fluid-contacting surface, sensors are not subjected to detrimental environmental effects such as icing, pollutant fouling, or liquid submersion. Moving parts are eliminated, thereby enhancing reliability.

Figure 1A:
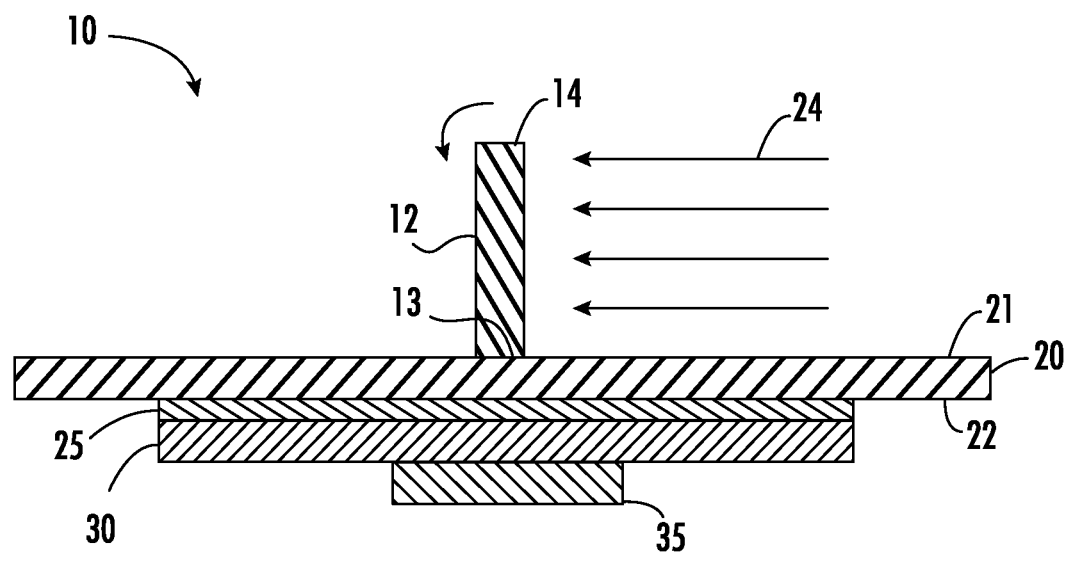
FIG. 1A is a cross-sectional view of a first apparatus configured for determining relative velocity, fluid flow, or angle of attack mounted to a body having a fluid-contacting surface and a non-fluid-contacting surface, including one deflecting element according to one embodiment.

FIG. 1A is a cross-sectional view of a first apparatus 10 configured for determining relative velocity, fluid flow, or angle of attack, mounted to (or integrated with) a body 20 having a fluid-contacting surface 21 and a non-fluid-contacting surface 22. The apparatus 10 includes a deflecting element 12 projecting outward from the fluid-contacting surface 21, with the deflecting element 12 including a proximal end 13 and a distal end 14, wherein the proximal end 13 is arranged on or against the fluid-contacting surface 21. The deflecting element 12 has a known modulus of elasticity (also referred to as Young's modulus or elastic modulus), wherein a higher modulus of elasticity value corresponds to a material having an increased capacity to withstand deformation without failure. Along the non-fluid-contacting surface 22 of the body 20, a strain sensor 35 is mounted to a substrate 32 that is coupled to the non-fluid-contacting surface 22 with an adhesive layer 25, which may embody any suitable epoxy, pressure-sensitive adhesive, chemical bonding agent, or the like. The substrate 35 may comprise a printed wiring board (PWB), which may be rigid or flexible in character, and may embody items such as FR-4 composite material, Kapton tape, or other rigid or flexible circuit board materials. The strain sensor 35 may comprise any suitable type of strain sensor, such as a piezoelectric strain sensor, a bimetallic strain sensor, an optical strain sensor, a MEMS strain sensor. In certain embodiments, the strain sensor may embody a FT-7805 MEMS strain sensor or a QM98000 MEMS strain sensor, both commercially available from Qorvo, Inc. (Greensboro, NC, USA). Utilization of MEMS sensors allows for a compact, modular apparatus.

In use, when the deflecting element 12 is exposed to a flow of fluid 24 (e.g., wind in the case of a land or air vehicle, or water in the case of a water vehicle), force is exerted on the deflecting element 12 to cause it to deflect in the direction of fluid flow. Since the deflecting element 12 is joined to the body 20, strain is imparted on the body 20 by the deflecting element 12. The strain sensor 35, which is also coupled (e.g., directly or indirectly) to the body 20, is configured to detect this strain imparted on the body 12 and will generate an output signal indicative of strain. This output signal can be used to determine relative velocity of the body 20 in the fluid 24, or flow of fluid 24 past the body 20, or (particularly if multiple differently oriented strain sensors are used, in combination with one or multiple deflecting elements) angle of attack between fluid 24 and the body 20.

Figure 1B:
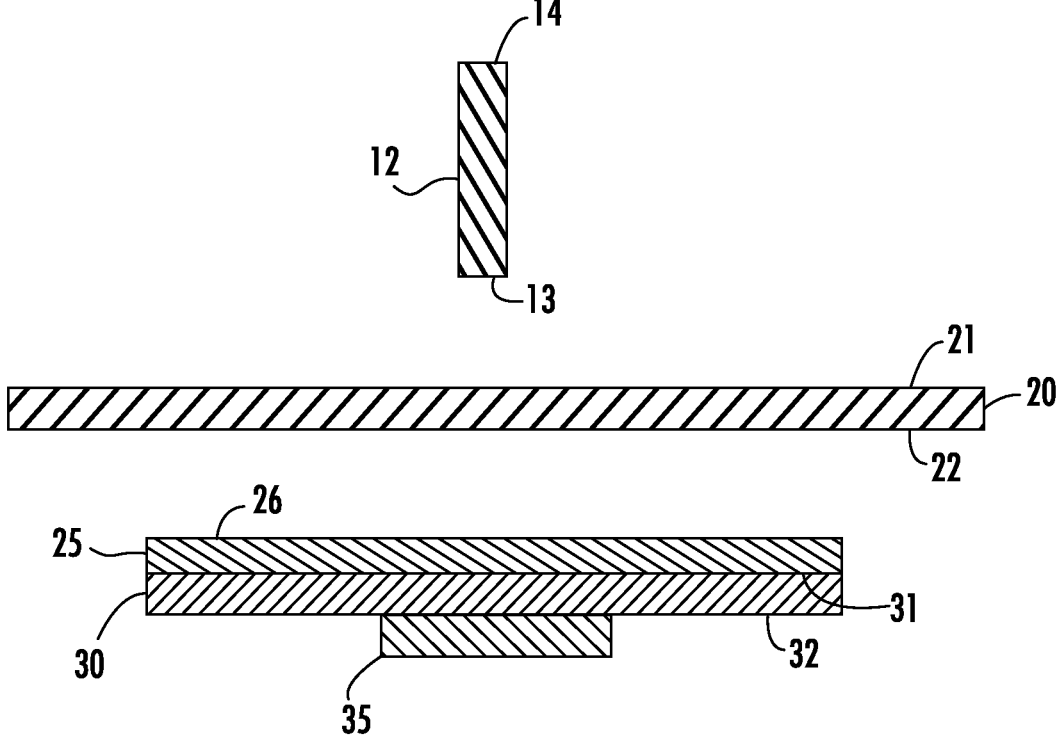
FIG. 1B is a partially exploded cross-sectional view of the apparatus of FIG. 1B.

FIG. 1B is a partially exploded cross-sectional view of the apparatus of FIG. 1B, showing the deflecting element 12 separated from the body 20 (e.g., prior to mounting of the deflecting element 12 to the body 20), and showing a subassembly including the substrate 30, strain sensor 35, and adhesive layer 25 separated from the body 20. As shown, the strain sensor 35 is arranged on a proximal surface 32 of the substrate 30, and the adhesive layer is arranged on an opposing distal surface 31 of the substrate 30. The adhesive layer 25 has a body-facing surface 26 configured to be attached to the non-fluid-contacting surface 22 of the body 20, while the deflecting element 12 has a proximal end 13 configured to be affixed to the fluid-contacting surface 21 of the body 20.

The deflecting element 12 may be provided in any suitable shape with a fixed drag coefficient ($C_d$) and area (A). In certain embodiments, the deflecting element 12 may comprise a generally cylindrical shape, an extruded polygonal shape, a conical shape, a frustoconical shape, or a generally teardrop or airfoil (when viewed in cross section) shape. In certain embodiments, the deflecting element 12 comprises a cross-sectional shape that is constant with respect to position relative to the fluid-contacting surface 21; in other embodiments, the deflecting element 12 comprises a tapered shape or other cross-sectional shape that changes with respect to position relative to the fluid-contacting surface 21.

Fluid density may be determined based on an operating environment (e.g., operating altitude or depth, and temperature of the environment), wherein density may be used in conjunction with strain signals to calculate relative velocity and/or fluid flow.

In the case of a cylindrical deflecting element of known diameter (d) and length (L), stress (S) may be calculated as $(W \times L)/(2 \times Z)$, where W refers to load (drag) and Z refers to section modulus of the body at the anchor point. Solving for W (which is drag), velocity (V) may be calculated as follows (where $C_d$ is coefficient of drag, A is area, and $\rho$ is fluid density):

$$V = \sqrt{\frac{2 \times W}{Cd \times A \times \rho}}$$

In certain embodiments, the deflecting element 12 comprises a greater elastic modulus than that of body 20. A high degree of rigidity may be desired to reduce element deflection and increase moment transfer to an area of the body 20 coupled to the deflecting element 12. In certain embodiments, the deflecting element comprises an elastic modulus that is less than or equal to that of the body 20.

In certain embodiments, the deflecting element 12 may be welded, brazed, or mechanically joined (e.g. with fasteners such as screws, rivets, clamps, etc.) to the body 20, or may be adhered to the body 20. In certain embodiments, body 20 is uninterrupted without an opening between the deflecting element 12 and the strain sensor 35, thereby eliminating any possibility of leakage of fluid to contact the non-fluid-contacting surface 22. In other embodiments, one or more openings in the body 20 may be provided between the strain sensor 35 and the deflecting element 20.

In certain embodiments, the body 20 comprises an outer wall (e.g., outer skin, fuselage, wing surface, airfoil surface, etc.) of a vehicle, such as a land vehicle, aircraft, or water vehicle. The fluid 24 may comprise air, water, or other liquid or gas. In certain embodiments, the deflecting element 14 comprises a pitotstatic tube, wherein the strain sensor 35 may provide secondary indication of airspeed as a backup or validation to a primary airspeed signal derived from the pitotstatic tube. In certain embodiments, the body 20 comprises a pipe, duct, or other conduit, wherein the deflecting element 12 protrudes into an interior volume of the pipe, duct, or conduit. Although pipes of circular cross sections are illustrated in the accompanying drawings, it is to be appreciated that pipes, ducts, and conduits are not so limited, and apparatuses disclosed herein may be used with pipes, ducts, and conduits of any suitable shapes and sizes.

In certain embodiments, multiple deflecting elements may be provided, each having at least one associated strain sensor. When multiple deflecting elements are provided, in certain embodiments the respective deflecting elements may comprise different sizes, materials, and/or elastic modulus values; in other embodiments, multiple deflecting elements that are substantially identical to one another may be provided. In certain embodiments, one deflecting element may be suitable for a low relative flow rates and another deflecting element may be suitable for high relative flow rates. In certain embodiments, multiple deflecting elements may be used to determine angle of attack, wherein respective strain sensors of the deflecting elements are arranged perpendicular to one another to enable directionality of relative flow to be determined.

Figure 2:
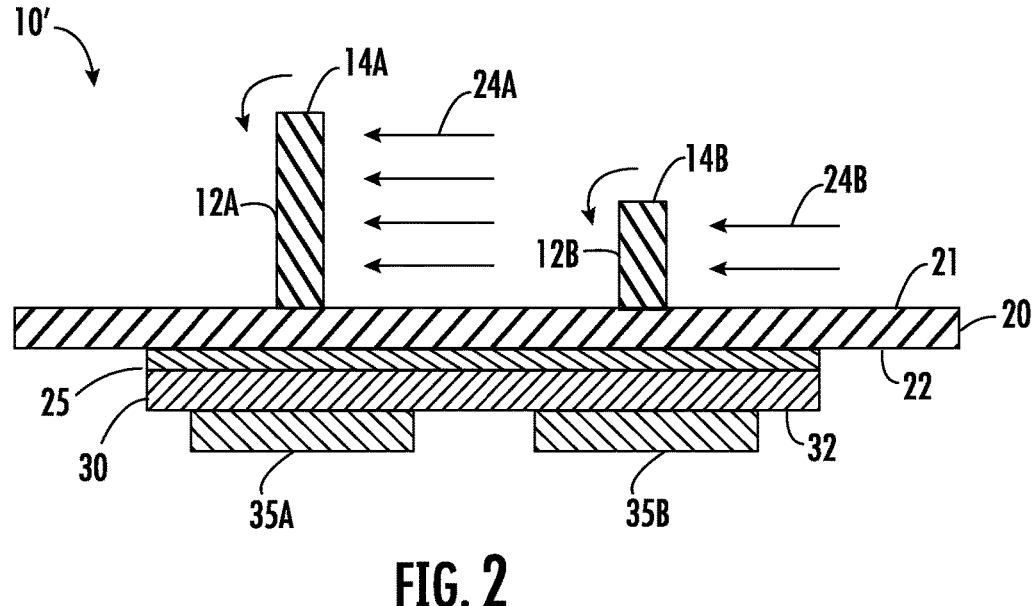
FIG. 2 is a cross-sectional view of a second apparatus configured for determining relative velocity, fluid flow, or angle of attack mounted to a body having a fluid-contacting surface and a non-fluid-contacting surface, including two differently-sized deflecting elements according to one embodiment.

FIG. 2 is a cross-sectional view of an apparatus 10' configured for determining relative velocity, fluid flow, or angle of attack, mounted to a body 20 having a fluid-contacting surface 21 and a non-fluid-contacting surface 22. The apparatus 10 includes two differently-sized deflecting elements 12A, 12B each projecting outward from the fluid-contacting surface 21, with each deflecting element 12A, 12B including a distal end 14A, 14B. Each deflecting element 12A, 12B has a known modulus of elasticity. Along the non-fluid-contacting surface 22 of the body 20, first and second strain sensors 35A, 35B are mounted to a substrate 32 that is coupled to the non-fluid-contacting surface 22 with an adhesive layer 25. Each deflecting element 12A, 12B may comprise the same or different material, and may comprise the same or different elastic modulus.

In use, the deflecting elements 12A, 12B may be exposed to a flow of fluid including a first fluid stream 24A and a second fluid stream 24B (wherein the first fluid stream includes portions farther away from the body 20), causing forces to be exerted on the deflecting elements 12A, 12B, thereby causing the deflecting elements 12A, 12B to be deflected in the direction of the first and second fluid streams 24A, 24B. Since the first deflecting element 12A is larger (i.e., longer) than the second deflecting element 12B, it will undergo greater deflection for a given relative fluid flow rate (i.e., relative rate of flow of fluid past the body 20), and may provide greater resolution at low relative flow rates, whereas the second deflecting element 12B may be suitable for use at higher relative flow rates. Since the deflecting elements 12A, 12B are joined to the body 20, strain is imparted on the body 20 by the deflecting elements 12A, 12B. The first strain sensor 35A is configured to detect strain imparted by the first deflecting element 12A on the body 20 and will generate a first output signal indicative of strain. The second strain sensor 35B is configured to detect strain imparted by the second deflecting element 12B on the body 20 and will generate a second output signal indicative of strain. These output signals can be used to determine relative velocity of the body 20 in the streams 24A, 24B, or flow of the fluid streams 24A, 24B (which are constituents of a single fluid stream) past the body 20. If the strain sensors 35A, 35B are oriented perpendicular to one another, then angle of attack between fluid and the body 20 may be determined.

Figure 3:
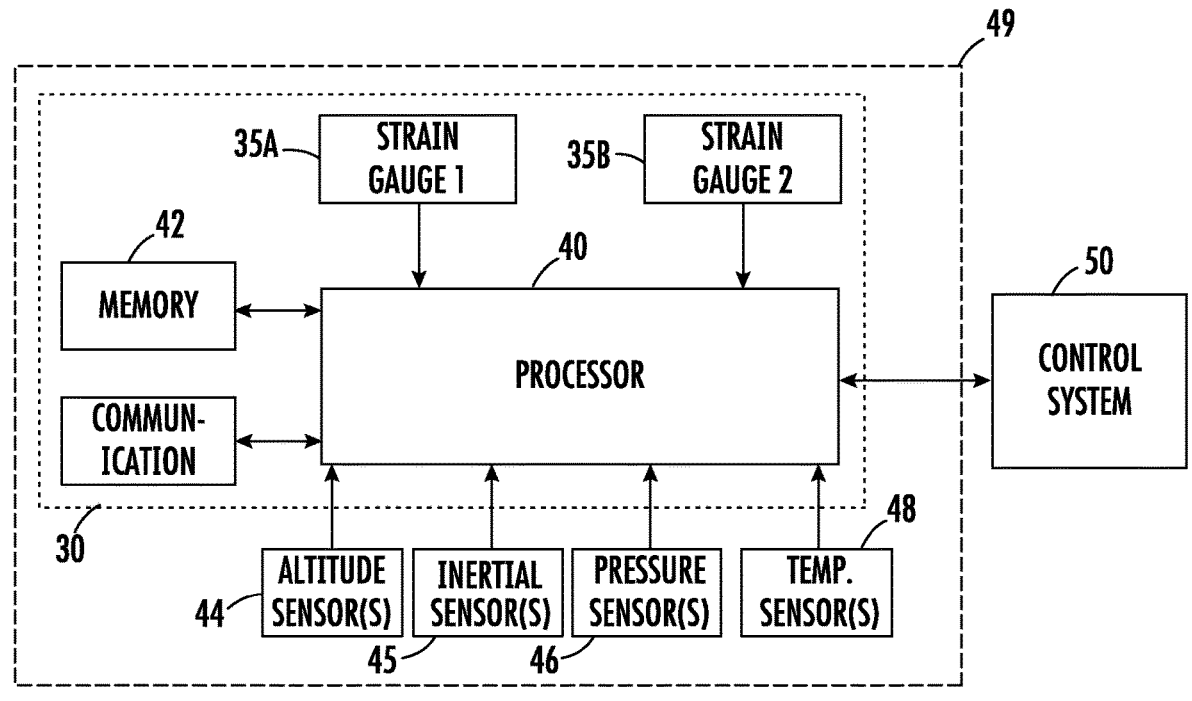
FIG. 3 is a schematic diagram showing interconnections between functional elements of an apparatus configured for determining relative velocity, fluid flow, or angle of attack mounted to a body having a fluid-contacting surface and a non-fluid-contacting surface, according to one embodiment.

FIG. 3 is a schematic diagram showing interconnections between functional elements of an apparatus 49 configured for determining relative velocity, fluid flow, or angle of attack configured to be mounted to a body having a fluid-contacting surface and a non-fluid-contacting surface. First and second strain sensors 35A, 35B (which may also be termed strain gauges) are configured to detect strain imparted by at least one deflecting element on a body (not shown) to which the sensors 35A, 35B are mounted by way of an intervening substrate 30. The strain sensors 35A, 35B may be mounted to the substrate 30 and arranged in communication with a processor 40 (e.g., a microprocessor or other integrated circuit device) having an associated memory 42, wherein the processor 40 and memory 42 may optionally be mounted to the substrate 30 as well. The processor 40 may be used to receive and process signals from the strain sensors 35A, 35B and any associated sensors (e.g., altitude sensor(s) 44, inertial sensor(s) 45, pressure sensor(s) 46, temperature sensor(s) 48, and the like) to produce processed signals indicative of flow rate, tilt/slope/acceleration, relative velocity, and/or angle of attack. A communication element 30, which may embody a wireless or wired transceiver in certain embodiments, may facilitate communication with the processor 40 and any external devices, such as external sensors (e.g., altitude sensor(s) 44, inertial sensor(s) 45, pressure sensor(s) 46, temperature sensor(s) 48, and the like). In certain embodiments, at least one temperature sensor 48 is in sensory communication with the body and configured to generate a signal indicative of temperature, wherein the processor 40 is configured to utilize the signal indicative of temperature to correct an output signal of one or both of the strain sensors 35A, 35B. A temperature sensor 48 may include a sensor external to a body, an internal sensor affixed to the body, or a sensor integrated with the substrate 30. In certain embodiments, at least one altitude sensor 44 is configured to detect altitude of a vehicle to which the apparatus 49 is mounted and to generate a signal indicative of altitude, wherein the processor 40 is configured to utilize the signal indicative of altitude to correct and/or validate an output signal of one or both of the strain sensors 35A, 35B. In certain embodiments, an altitude sensor 44 may include a barometric sensor, a radio altimeter, or a global positioning system sensor, among other types. In certain embodiments, at least one inertial sensor 45 is configured to detect at least one of tilt, slope, and acceleration of a body or vehicle to which the apparatus 49 is mounted, wherein the processor 40 is configured to utilize a signal received from the inertial sensor to correct and/or validate an output signal of one or both of the strain sensors 35A, 35B. In certain embodiments, at least one pressure sensor 46 is configured to detect pressure of the fluid in contact with a body to which the apparatus 49 is mounted to generate a signal indicative of pressure, wherein the processor is configured to utilize the signal indicative of pressure to correct and/or validate an output signal of one or both of the strain sensors 35A, 35B. In certain embodiments, the various sensors 44, 45, 46, 48 may be remotely located relative to the strain sensors 35A, 35B and the processor 40, and may be in wired or wireless communication with the processor 40. An external control system 50 may be arranged to receive signals from, and/or send signals to, the processor 40. In certain embodiments, the external control system 50 may include one or more processors configured to monitor and/or control a vehicle, or configured to monitor and/or control flow of fluid (e.g., liquid, gas, slurry, suspension, liquid/solid mixture, etc.) in one or more pipes, conduits, or ducts.

Figures 4, 5, 6A, 6B:
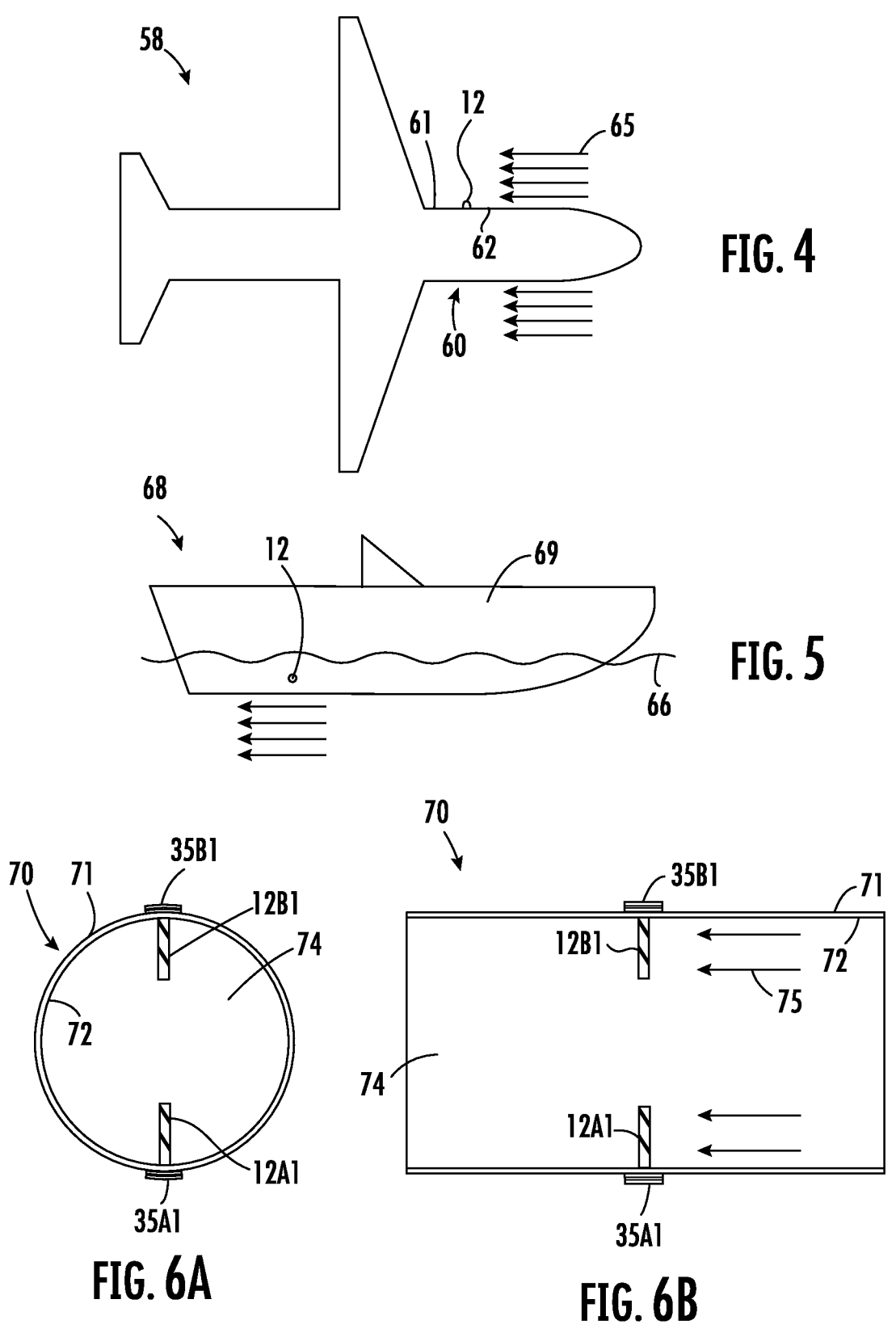
FIG. 4 is a top view illustration of an airplane including an apparatus configured for determining relative velocity, fluid flow, or angle of attack according to one embodiment.
FIG. 5 is a side view illustration of a watercraft including an apparatus configured for determining relative velocity, fluid flow, or angle of attack according to one embodiment.
FIG. 6A is a front elevational view of a first pipe-mounted apparatus configured for determining relative velocity, fluid flow, or angle of attack of fluid within a pipe segment according to one embodiment, the apparatus including opposing first and second deflecting elements each having an associated strain sensor.
FIG. 6B is a side cross-sectional view of the apparatus of FIG. 6A.

FIG. 4 is a top view illustration of an airplane 58 including an apparatus configured for determining relative velocity, fluid flow, or angle of attack according to one embodiment. To calculate velocity of a vehicle, a deflecting element may be placed at any point along an exterior of a vehicle where fluid flow is known to be uniform and proportionate to velocity (i.e., away from known vortex generation points). The apparatus includes a deflecting element 12 arranged along a fluid-contacting surface 61 of a body (e.g., fuselage wall, wing, etc.) 60 of the airplane 58 to contact a flow of fluid 65, wherein it is understood that at least one strain sensor (not shown) will be arranged along a non-fluid contacting surface 62 of the body 60 to detect strain imparted on the body 60 by deflection of the deflecting element 12.

In certain embodiments, deflection elements may be placed along top and bottom areas of foil elements (e.g., wings) to enable determination of pressure differentials, such as lift.

FIG. 5 is a side view illustration of a watercraft 68 (e.g., boat or other water vehicle) including an apparatus configured for determining relative velocity, fluid flow, or angle of attack according to one embodiment. The apparatus includes a deflecting element 12 arranged along a fluid-contacting surface 69 of a body (e.g., hull wall, foil, etc.) of the watercraft 68, preferably below a waterline, to contact liquid 66, wherein it is understood that at least one strain sensor (not shown) will be arranged along a non-fluid contacting surface of the body to detect strain imparted on the body by deflection of the deflecting element 12.

In certain embodiments, an apparatus disclosed herein utilizing at least one deflecting element and at least one strain sensor may be used to detect flow within a pipe, duct, or conduit. A deflecting element may extend partially into an interior cavity of a pipe, duct, or conduit, or span an entire internal width thereof. The drag of a deflecting element anchored to a fluid-contacting surface of a pipe, duct, or conduit will generate a moment that will be transferred to the point of the pipe, duct, or conduit (i.e., body) to which the deflecting element is anchored. A strain sensor will detect this stress (S). In the case of a cylindrical deflecting element of known diameter (d) and length (L), the measured force provides the information to determine the velocity of fluid though the pipe, duct, or conduit, according to the following equation (where W equals load, and Z equals sectional modulus of the body material at the point where the deflecting element is anchored):

$$V = \sqrt{\frac{2 \times W}{Cd \times A \times \rho}}$$

A cavity of the pipe, duct, or conduit will be of a known cross-sectional area ($A_c$), from which the mass flow rate (mf) can be calculated according to the following equation (where p equals fluid density):

$$mf = \rho \times V \times A_c$$

FIGS. 6A and 6B provide front elevational and side cross-sectional views of a first pipe-mounted apparatus configured for determining relative velocity, fluid flow, or angle of attack of fluid within a segment of a pipe 70 according to one embodiment, the apparatus including opposing first and second deflecting elements 12A1, 12B1 each protruding from a fluid-contacting surface 72 into an interior 74 of the pipe 70, and each having an associated strain sensor 35B1, 35B2 coupled to a non-fluid-contacting surface 71 of the pipe 70. The first and second deflecting elements 12A1, 12B1 may be placed for diversity and volumetric capacity measurements. In certain embodiments, one deflecting element 12A1 is positioned at a bottom of the pipe 70 and protrudes upward so that flow of fluid (75 in FIG. 6B) within the pipe 70 may be detected even when the interior 74 of the pipe 70 is not completely filled with fluid. An advancing flow of fluid 75 exerts force on one or both of the deflecting elements 12A1, 12B1, causing them to deflect and impart strain on portions of the pipe 70. This strain is detected by the strain sensors 35A1, 35B1 and may be used to detect fluid flow (or relative velocity or angle of attack, if appropriate) of fluid 75 within the pipe 70.

In applications such as unpressurized liquid-filled cavities (e.g., storm or sewer drains), utilization of a second deflecting element 12B1 opposing a first deflecting element 12B1 is beneficial to enable capacity utilization to be determined.

Figures 7A, 7B, 8A, 8B:
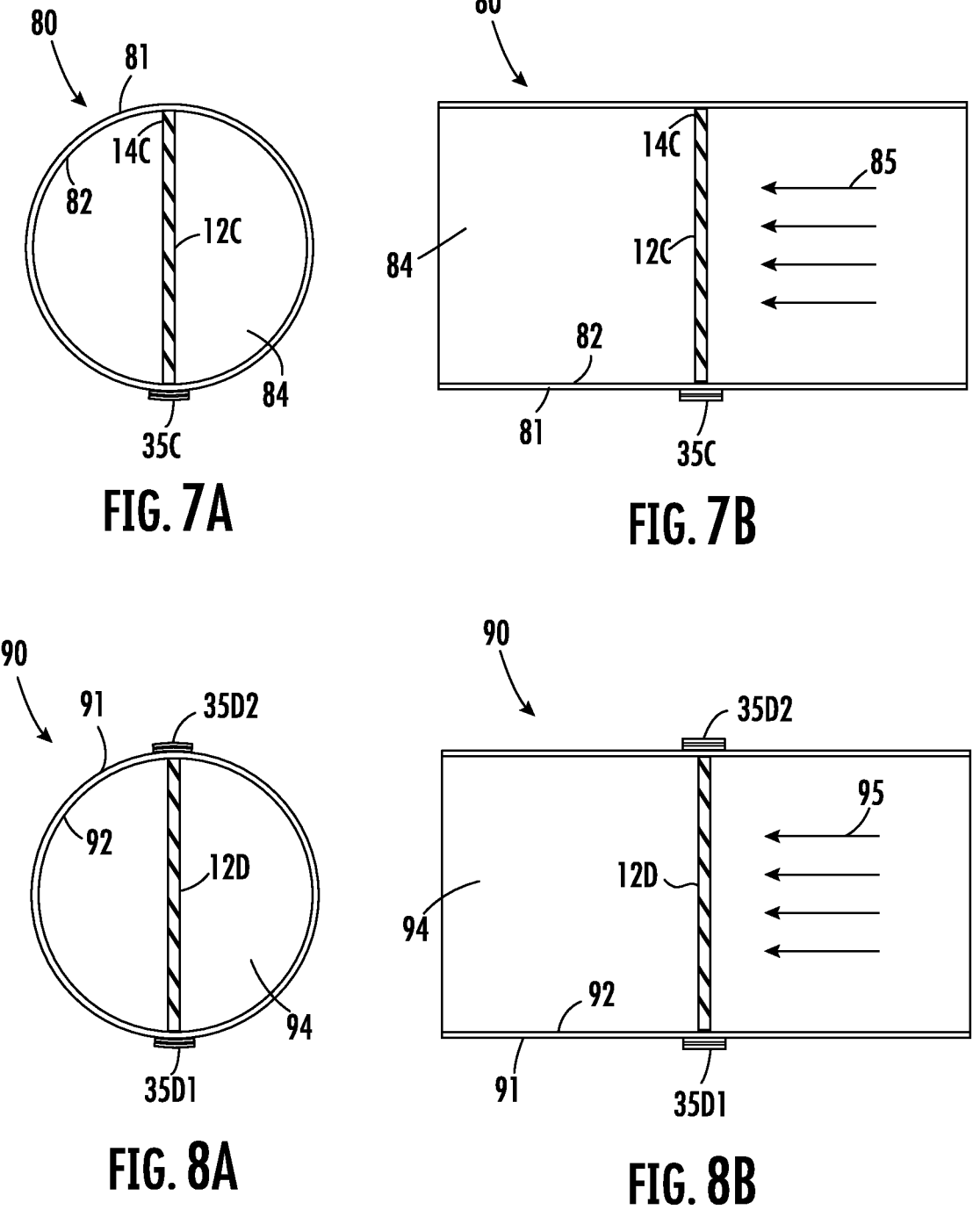
FIG. 7A is a front elevational view of a second pipe-mounted apparatus configured for determining relative velocity, fluid flow, or angle of attack of fluid within a pipe segment according to one embodiment, the apparatus including one deflecting element extending across a majority of an inner diameter of the pipe segment and having an associated strain sensor.
FIG. 7B is a side cross-sectional view of the apparatus of FIG. 7A.
FIG. 8A is a front elevational view of a third pipe-mounted apparatus configured for determining relative velocity, fluid flow, or angle of attack of fluid within a pipe segment according to one embodiment, the apparatus including one deflecting element extending across an entire inner diameter of the pipe segment, with the deflecting element mounted at opposing ends and having two associated strain sensors.
FIG. 8B is a side cross-sectional view of the apparatus of FIG. 8A.

FIGS. 7A and 7B provided front elevational and side cross-sectional views of a second pipe-mounted apparatus configured for determining relative velocity, fluid flow, or angle of attack of fluid within a segment of a pipe 80 according to one embodiment, the apparatus including one deflecting element 12C extending across a majority (e.g., at least 51%, at least 60%, at least 70%, at least 80%, or at least 90%) of an inner diameter of the pipe 80, with the deflecting element 12C having an associated strain sensor 35C. The deflecting element 12C is coupled to a fluid-contacting inner surface 82 of the pipe 80, without a distal end 14C of the deflecting element 12C contacting the fluid-contacting inner surface 82. The strain sensor 35C is coupled to the non-fluid-contacting outer surface 81. An advancing flow of fluid 85 exerts force on the deflecting element 12C, causing it to deflect and impart strain on a portion of the pipe 80 proximate to the strain sensor 35C. This strain is detected by the strain sensor 35C and may be used to detect fluid flow (or relative velocity or angle of attack, if appropriate) of fluid 85 within the pipe 80.

In certain embodiments, both ends of a deflecting element may be supported in a pipe, duct, or other conduit, and strain sensors may be arranged proximate to both supported ends. For example, FIGS. 8A and 8B provide front elevational and side cross-sectional views of a third pipe-mounted apparatus configured for determining relative velocity, fluid flow, or angle of attack of fluid within a segment of a pipe 90 according to one embodiment. The apparatus includes one deflecting element 12D extending across an entire inner diameter of the pipe 90, with the deflecting element 12D mounted to a fluid-contacting inner surface 92 of the pipe 90 proximate to strain sensors 35D1, 35D2 coupled to a non-fluid-contacting outer surface 91 of the pipe 90. An advancing flow of fluid 95 exerts force on the deflecting element 12D, causing it to deflect and impart strain on portions of the pipe 90 proximate to the strain sensors 35D1, 35D2. This strain is detected by the strain sensors 35D1, 35D2 and may be used to detect fluid flow (or relative velocity or angle of attack, if appropriate) of fluid 95 within the pipe 90.

In certain embodiments, multiple strain sensors may be arranged perpendicular to one another to enable determination of angle of attack of a body relative to a fluid (or direction of a fluid relative to a body). A first strain sensor may be arranged perpendicular to a second strain sensor, with the strain sensors either positioned proximate to (and equidistant from) a single deflecting element, or with the first and second strain sensors positioned proximate to corresponding first and second deflecting elements. A first strain sensor may be used to detect strain corresponding to an x-component of force exerted on one or more deflecting elements, and a second strain sensor may be used to detect strain corresponding to a y-component of force exerted on one or more deflecting elements. Signals from the first and second strain sensors may be processed to determine directionality of relative motion (e.g., angle of attack) between a body and a fluid.

Figure 9:
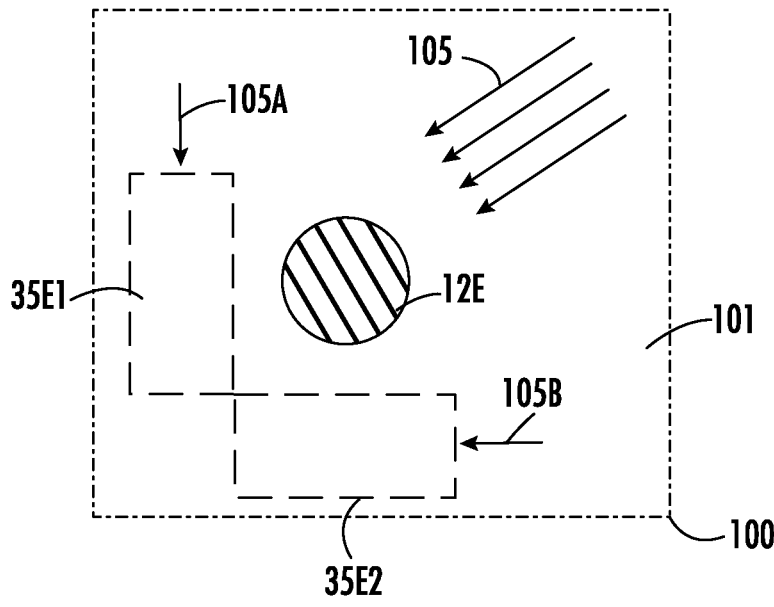
FIG. 9 is a top plan view illustration of an apparatus configured for determining angle of attack of fluid, including a single deflecting element and two strain sensors configured to detect strain imparted on a body by the single deflecting element, with the two strain sensors being mounted perpendicular to one another.

FIG. 9 is a top plan view illustration of an apparatus configured for determining angle of attack of fluid, including a single deflecting element 12E (mounted to a body 101) and two strain sensors 35E1, 35E2 configured to detect strain imparted on the body 101 by the single deflecting element 12E, with the two strain sensors 35E1, 35E2 being mounted perpendicular to one another. It is to be appreciated that the deflecting element 12E protrudes from a fluid-contacting surface of the body 101 (i.e., contacting fluid flow 105), and the strain sensors 35E1, 35E2 are coupled to a non-fluid-contacting surface of the body 101 (such that the strain sensors 35E1, 35E2 are shown in dashed line format). As shown, the strain sensors 35E1, 35E2 are positioned equidistantly from the deflecting element 12E. In use, a first strain sensor 35E1 may be used to detect a y-component 105A of the fluid flow 105, and a second strain sensor 35E2 may be used to detect an x-component 105B of the fluid flow 105. Signals from both strain sensors 35E1, 35E2 may be processed to determine directionality of the fluid flow 105 relative to the body 101, optionally in combination with determine flow rate of the fluid 105.

Figure 10:
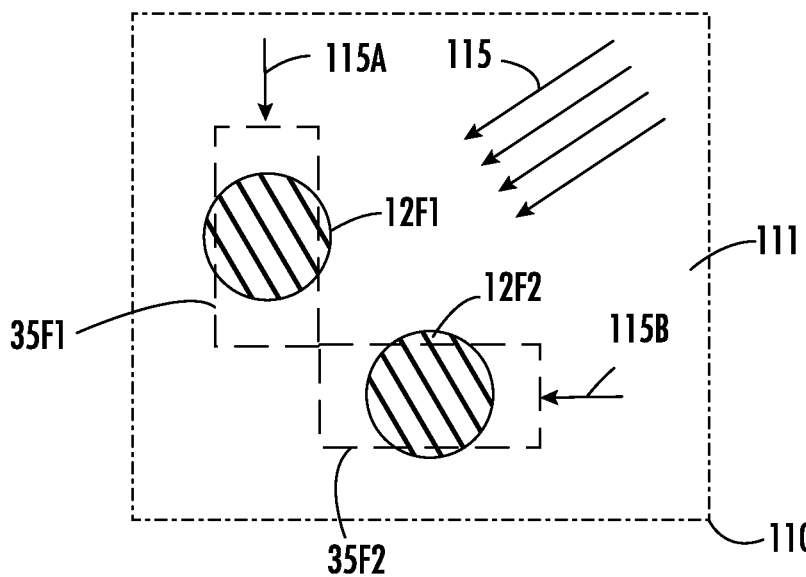
FIG. 10 is a top plan view illustration of an apparatus configured for determining angle of attack of fluid, including first and second deflecting elements each having an associated strain sensor configured to detect strain imparted on a body by the corresponding deflecting element, with the first and second strain sensors being mounted perpendicular to one another.

FIG. 10 is a top plan view illustration of an apparatus configured for determining angle of attack of fluid, including first and second deflecting elements 35F1, 35F2 (mounted to a body 111) each having an associated strain sensor 35F1, 35F2 configured to detect strain imparted on a body by the corresponding deflecting element 12F1, 12F2, with the two strain sensors 35F1, 35F2 being mounted perpendicular to one another. It is to be appreciated that the deflecting elements 12F1, 12F2 protrude from a fluid-contacting surface of the body 111 (i.e., contacting fluid flow 115), and the strain sensors 35F1, 35F2 are coupled to a non-fluid-contacting surface of the body 111 (such that the strain sensors 35F1, 35F2 are shown in dashed line format). As shown, each strain sensors 35F1, 35F2 is positioned directly below a corresponding deflecting element 12F1, 12F2. In use, a first strain sensor 35F1 may be used to detect a y-component 115A of the fluid flow 115, and a second strain sensor 35F2 may be used to detect an x-component 115B of the fluid flow 115. Signals from both strain sensors 35F1, 35F2 may be processed to determine directionality of the fluid flow 115 relative to the body 111, optionally in combination with determine flow rate of the fluid 115.

Those skilled in the art will recognize improvements and modifications to the preferred embodiments of the present disclosure. All such improvements and modifications are considered within the scope of the concepts disclosed herein and the claims that follow. Any of the various features and elements as disclosed herein may be combined with one or more other disclosed features and elements unless indicated to the contrary herein.

What is claimed is:

1. An apparatus for determining relative velocity, fluid flow, or angle of attack between a fluid and a body having a fluid-contacting surface and a non-fluid-contacting surface that opposes the fluid-contacting surface, the apparatus comprising:

a plurality of deflecting elements joined to the body and extending from the fluid-contacting surface into the fluid; and a plurality of strain sensors coupled to the non-fluid-contacting surface;

wherein each deflecting element of the plurality of deflecting elements has one or more strain sensors of the plurality of strain sensors in sensory communication therewith; and wherein the plurality of strain sensors is configured to detect strain imparted on the body by deflection of the at least one deflecting element.

2. The apparatus of claim 1, further comprising a substrate between the plurality of strain sensors and the non-fluid-contacting surface.

3. The apparatus of claim 2, wherein the substrate comprises a printed wiring board.

4. The apparatus of claim 3, further comprising a processor mounted to the printed wiring board.

5. The apparatus of claim 2, further comprising an adhesive between the substrate and the non-fluid-contacting surface.

6. The apparatus of claim 1, further comprising a temperature sensor in sensory communication with the body and configured to generate a signal indicative of temperature, wherein the apparatus is configured to utilize the signal indicative of temperature to correct an output signal of at least one strain sensor of the plurality of strain sensors.

7. The apparatus of claim 1, wherein at least one deflecting element of the plurality of deflecting elements extends from the fluid-contacting surface into the fluid in a cantilever arrangement.

8. The apparatus of claim 1, further comprising a pressure sensor configured to detect pressure of the fluid to generate a signal indicative of pressure, wherein the apparatus is configured to utilize the signal indicative of pressure to correct and/or validate an output signal of at least one strain sensor of the plurality of strain sensors.

9. The apparatus of claim 1, wherein the body is uninterrupted without an opening between the at least one deflecting element and the plurality of strain sensors.

10. The apparatus of claim 1, wherein at least one deflecting element of the plurality of deflecting elements is integrally formed with the body.

11. The apparatus of claim 1, wherein at least one deflecting element of the plurality of deflecting elements is mechanically joined or welded to the body.

12. The apparatus of claim 1, wherein the body comprises a pipe or conduit containing the fluid.

13. The apparatus of claim 12, wherein at least one deflecting element of the plurality of deflecting elements extends across substantially an entire inner diameter or inner width of the pipe or conduit.

14. The apparatus of claim 12, wherein the plurality of deflecting elements comprises a first deflecting element extending radially inward in a first direction within the pipe or conduit, and a second deflecting element extending radially inward in a second direction within the pipe or conduit, wherein the second direction opposes the first direction.

15. The apparatus of claim 1, wherein the plurality of deflecting elements comprises a first deflecting element having a first length and first maximum width, and comprises a second deflecting element having a second maximum width, the apparatus further comprising at least one of the following features (i) and (ii): (i) the first length differs from the second length; and (ii) the first maximum width differs from the second maximum width.

16. The apparatus of claim 1, wherein the plurality of deflecting elements comprises a first deflecting element comprising a first material, and comprises a second deflecting element comprising a second material, wherein the first material differs from the second material.

17. The apparatus of claim 1, wherein the plurality of strain sensors comprises a first strain sensor and a second strain sensor, with the second strain sensor mounted substantially perpendicular to the first strain sensor, wherein the first strain sensor is configured to detect deflection in a first direction, and the second strain sensor is configured to detect deflection in a second direction that is substantially perpendicular to the first direction.

18. An apparatus for determining relative velocity, fluid flow, or angle of attack between a fluid and a body having a fluid-contacting surface and a non-fluid-contacting surface that opposes the fluid-contacting surface, the apparatus comprising:

at least one deflecting element joined to the body and extending from the fluid-contacting surface into the fluid; and at least one strain sensor coupled to the non-fluid-contacting surface;

wherein the at least one strain sensor is configured to detect strain imparted on the body by deflection of the at least one deflecting element;

wherein the body comprises an external wall, a wing, or a foil of a vehicle; and wherein the apparatus comprises at least one of the following features (i) and (ii):

(i) the at least one deflecting element comprises a pitot-static tube; and (ii) the apparatus comprises an altitude sensor configured to detect altitude of the vehicle and to generate a signal indicative of altitude, wherein the apparatus is configured to utilize the signal indicative of altitude to correct and/or validate an output signal of the at least one strain sensor.

19. The apparatus of claim 18, wherein the apparatus comprises feature (i), namely, the at least one deflecting element comprises a pitotstatic tube.

20. The apparatus of claim 18, wherein the apparatus comprises feature (ii), namely, the apparatus comprises an altitude sensor configured to detect altitude of the vehicle and to generate a signal indicative of altitude, wherein the apparatus is configured to utilize the signal indicative of altitude to correct and/or validate an output signal of the at least one strain sensor.

21. A method for fabricating an apparatus for determining relative velocity, fluid flow, or angle of attack between a fluid and a body having a fluid-contacting surface and a non-fluid-contacting surface that opposes the fluid-contacting surface, the method comprising:

forming a plurality of deflecting elements on, or joining a plurality of deflecting elements to, the body to cause the plurality of deflecting elements to extend from the fluid contacting surface to into the fluid; and coupling a plurality of strain sensors to the non-fluid contacting surface, with each deflecting element of the plurality of deflecting elements having one or more strain sensors of the plurality of strain sensors in sensory communication therewith, so that the plurality of strain sensors is configured to detect strain imparted on the body by deflection of the plurality of deflecting elements.

22. The method of claim 21, further comprising providing a substrate between the plurality of strain sensors and the non-fluid-contacting surface.

23. The method of claim 22, wherein the plurality of strain sensors is affixed to the substrate, and the coupling of plurality of strain sensors to the non-fluid contacting surface comprises adhering the substrate to the non-fluid-contacting surface.

24. The method of claim 21, wherein the forming of a plurality of deflecting elements on, or joining a plurality of deflecting elements to, the body comprises adhering or welding the plurality of deflecting elements to the body.

* * * * *